(12) United States Patent
Huang et al.

(10) Patent No.: US 7,611,651 B2
(45) Date of Patent: *Nov. 3, 2009

(54) METHOD FOR MANUFACTURING CARBON NANOTUBES WITH UNIFORM LENGTH

(75) Inventors: Hua Huang, Beijing (CN);
Chang-Hong Liu, Beijing (CN);
Shou-Shan Fan, Beijing (CN)

(73) Assignees: Tsinghua University, Beijing (CN);
Hon Hai Precision Industry Co.,Ltd., Tu-Cheng, Taipei Hsien (TW)

( * ) Notice: Subject to any disclaimer, the term of this patent is extended or adjusted under 35 U.S.C. 154(b) by 743 days.

This patent is subject to a terminal disclaimer.

(21) Appl. No.: 11/025,160

(22) Filed: Apr. 21, 2005

(65) Prior Publication Data

US 2006/0055074 A1 Mar. 16, 2006

(30) Foreign Application Priority Data

May 13, 2004 (CN) .......... 2004 1 0027249

(51) Int. Cl.
*B32B 3/26* (2006.01)

(52) U.S. Cl. .......... 264/134; 264/138; 264/301

(58) Field of Classification Search .......... 264/643, 264/140, 211, 235, 472, 401, 237; 428/402, 428/364; 977/735, 742, 743, 773, 810, 842, 977/848, 855, 856; 438/689; 257/77; 524/495, 524/871, 875; 165/185; 361/704

See application file for complete search history.

(56) References Cited

U.S. PATENT DOCUMENTS

| | | | | |
|---|---|---|---|---|
| 3,198,865 | A * | 8/1965 | Paine et al. | 264/219 |
| 4,003,773 | A * | 1/1977 | Grable | 156/155 |
| 6,350,488 | B1 | 2/2002 | Lee et al. | |
| 6,531,828 | B2 * | 3/2003 | Yaniv et al. | 315/169.3 |
| 6,924,335 | B2 * | 8/2005 | Fan et al. | 524/495 |
| 2004/0137730 | A1 * | 7/2004 | Kim et al. | 438/689 |
| 2007/0059864 | A1 * | 3/2007 | Huang et al. | 438/118 |

* cited by examiner

*Primary Examiner*—Monica A Huson
(74) *Attorney, Agent, or Firm*—D. Austin Bonderer

(57) ABSTRACT

A method for manufacturing carbon nanotubes with a uniform length includes the steps of: (a) forming an array of carbon nanotubes on a substrate; (b) submerging the carbon nanotubes in liquid macromolecular material; (c) solidifying the liquid macromolecular material; (d) cutting the solidified liquid macromolecular material; and (e) removing the macromolecular material to obtain the carbon nanotubes with a uniform length. The method is simple, and carbon nanotubes with a desired length can be easily obtained. The length of the carbon nanotubes can be precisely controlled. Furthermore, each carbon nanotube is open at both ends thereof.

14 Claims, 1 Drawing Sheet

METHOD FOR MANUFACTURING CARBON NANOTUBES WITH UNIFORM LENGTH

BACKGROUND OF THE INVENTION

1. Field of the invention

The invention relates generally to methods for manufacturing carbon nanotubes; and more particularly to a method for manufacturing carbon nanotubes with a uniform length.

2. Description of Related Art

Carbon nanotubes have interesting electrical, magnetic, nonlinear optical, thermal, and mechanical properties, and these unusual properties have led to diverse potential applications for carbon nanotubes in materials science and nanotechnology. For example, in an article entitled "Unusually High Thermal Conductivity of Carbon Nanotubes" and authored by Savas Berber (page 4613, Vol. 84, Physical Review Letters 2000), it is shown that a heat conduction coefficient of a carbon nanotube can be 6600 W/mK (watts/milliKelvin) at room temperature. One important application of carbon nanotubes is to form a thermal interface material by incorporating a plurality of carbon nanotubes in a matrix material. This application utilizes the excellent heat conduction coefficient of the carbon nanotubes.

Other applications involve the use of freestanding carbon nanotubes, especially freestanding carbon nanotubes having a uniform length. At present, the most notable method for manufacturing carbon nanotubes having a uniform length is chemical vapor deposition. The length of the carbon nanotubes manufactured by this method can be controlled to some extent by controlling the growth time. However, the precision of length control is low. Furthermore, once the carbon nanotubes have been grown, their length is fixed and they cannot be trimmed. If the length is not the desired length, a completely new batch of carbon nanotubes must be grown. Another method for obtaining carbon nanotubes having a uniform length utilizes the technology of making thermal interface materials. This is because in some thermal interface materials, the carbon nanotubes in the matrix have a uniform length. Therefore once the thermal interface material is made, the desired carbon nanotubes can be extracted therefrom.

U.S. Pat. No. 6,407,922 discloses a thermal interface material comprising a matrix material and a plurality of carbon nanotubes incorporated in the matrix material. A first surface of the thermal interface material engages with an electronic device, and a second surface of the thermal interface material engages with a heat sink. The second surface has a larger area than the first surface, so that heat can be uniformly spread over the larger second surface.

In this application of the thermal interface material, the carbon nanotubes are required to have a uniform length to ensure that the thermal interface material has uniform physical characteristics. However, in practice, the uniformity of length obtained is not precise.

A new method for manufacturing carbon nanotubes which overcomes the above-mentioned problems is desired.

BRIEF SUMMARY OF THE INVENTION

Accordingly, an object of the present invention is to provide a method for manufacturing carbon nanotubes with a precise uniform length.

To achieve the above-mentioned object, the present invention provides a method comprising the steps of:

(a) forming an array of carbon nanotubes on a substrate;
(b) submerging the carbon nanotubes in liquid macromolecular material;
(c) solidifying the liquid macromolecular material;
(d) cutting the solidified macromolecular material; and
(e) removing the macromolecular material to thereby obtain the carbon nanotubes with a uniform length.

Unlike in the prior art, the carbon nanotubes manufactured by the method of the present invention can have a desired length by carrying out the cutting process accordingly. The method is easy to perform, and the length of the carbon nanotubes can be precisely controlled. Furthermore, each carbon nanotube is open at both ends thereof, and all the carbon nanotubes have a uniform length.

Other objects, advantages and novel features of the invention will become more apparent from the following detailed description when taken in conjunction with the accompanying drawings, in which:

DESCRIPTION OF THE PREFERRED EMBODIMENT

Figure 1:
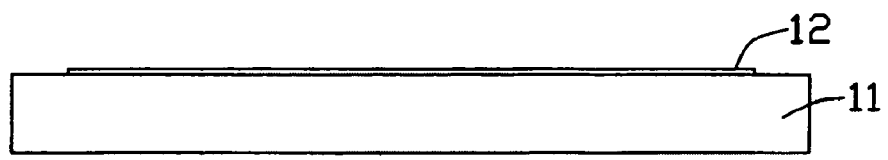
FIG. 1 is a schematic side elevation of a substrate having a catalyst film attached thereon according to the present invention.
Figure 2:
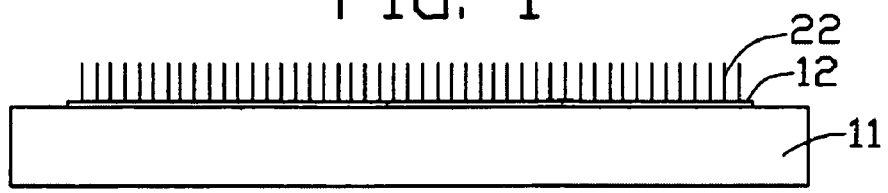
FIG. 2 is similar to FIG. 1, but showing an array of carbon nanotubes directionally formed on the substrate.

Referring to FIG. 1, a substrate 11 having a catalyst film 12 attached thereon is shown. In FIG. 2, an array of carbon nanotubes 22 directionally formed on the substrate 11 is shown. The carbon nanotubes 22 are manufactured by way of thermal chemical vapor deposition or plasma enhanced chemical vapor deposition. In a preferred method of the present invention, the carbon nanotubes 22 are manufactured as follows. Firstly, the substrate 11 is provided. The substrate 11 can be made of glass, quartz, silicon, or alumina. In the preferred embodiment, the substrate 11 is made of porous silicon. A surface of the porous silicon is a porous layer. Diameters of apertures in the porous layer are extremely small, generally about 3 nanometers. Then the catalyst film 12 is uniformly disposed on the substrate 11 by chemical vapor deposition, thermal disposition, electron-beam disposition, or sputtering. The catalyst film 12 can be made of iron (Fe), cobalt (Co), nickel (Ni), or an alloy thereof. In the preferred embodiment, the catalyst film 12 is made of iron.

Secondly, the catalyst film 12 is oxidized to obtain catalyst particles (not shown). Then, the substrate 11 with the catalyst particles disposed thereon is placed in a reaction furnace (not shown), and a carbon source gas is provided in the reaction furnace at a temperature of 700-1000° C. to grow the array of carbon nanotubes 22. The carbon source gas can be acetylene or ethene. A height of the array of carbon nanotubes 22 can be controlled by controlling the growth time thereof. Details of the method for growing the array of carbon nanotubes 22 can be found in pages 512-514, Vol. 283, Science 1999, and in pages 11502-11503, Vol. 123, J. Am. Chem. Soc. 2001. Moreover, U.S. Pat. No. 6,350,488 discloses a method for mass synthesis of arrays of carbon nanotubes. These three publications are incorporated herein by reference.

Figure 3:
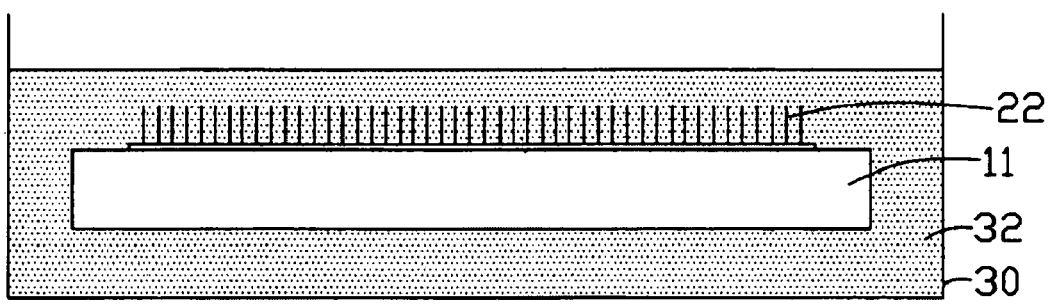
FIG. 3 is similar to FIG. 2, but showing the substrate with the carbon nanotubes immersed in a liquid macromolecular material.

FIG. 3 shows the carbon nanotubes 22 with the substrate 11 immersed in a container 30 of liquid macromolecular material 32. That is, after the growth of the carbon nanotubes 22 is completed, the liquid macromolecular material 32 is provided in order to completely immerse the carbon nanotubes 22 therewithin. In the preferred embodiment, the liquid macromolecular material 32 is paraffin. A viscosity of the liquid macromolecular material 32 is required to be below 200 cps (centipoise).

Figure 4:
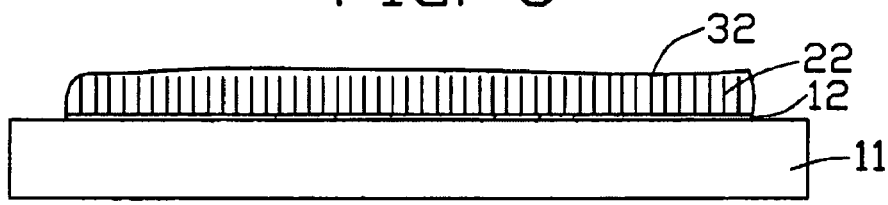
FIG. 4 is similar to FIG. 3, but showing only the substrate, with the carbon nanotubes on the substrate embedded in solidified macromolecular material.
Figure 5:
FIG. 5 is similar to FIG. 4, but showing only the solidified macromolecular material with the carbon nanotubes embedded therein after the solidified macromolecular material has been cut.

Referring to FIGS. 4 and 5, the substrate 11 having the carbon nanotubes 22 immersed in the liquid macromolecular material 32 is taken out of the container 30. Then, the liquid macromolecular material 32 is cooled and solidified. A top portion of the solidified macromolecular material 32 is cut by a cutter (not shown) in a direction perpendicular to the long axes of the carbon nanotubes 22 and at a predetermined elevation thereof. The solidified macromolecular material 32 with the carbon nanotubes 22 secured therein can be peeled off from the substrate 11 either before or after the above-described cutting process. Then a bottom portion of the solidified macromolecular material 32 is cut by the cutter in the same direction at a predetermined elevation to obtain a macromolecular material film 40.

Alternatively, the liquid macromolecular material 32 is cooled and solidified while the substrate 11 having the carbon nanotubes 22 remains in the container 30. Then the substrate 11 having the carbon nanotubes 22 secured in the solidified macromolecular material 32 is taken out of the container 30. A top portion of the solidified macromolecular material 32 is cut by a cutter (not shown) in a direction perpendicular to the long axes of the carbon nanotubes 22 and at a predetermined elevation thereof. The solidified macromolecular material 32 with the carbon nanotubes 22 secured therein can be peeled off from the substrate 11 either before or after the above-described cutting process. Then a bottom portion of the solidified macromolecular material 32 is cut by the cutter in the same direction at a predetermined elevation to obtain the macromolecular material film 40.

Detailedly, the cutting process is performed as follows. Firstly, the top portion of the solidified macromolecular material 32 is cut by the cutter in the direction perpendicular to the long axes of the carbon nanotubes 22. This removes the solidified macromolecular material 32 upon the carbon nanotubes 22, so that each carbon nanotube 22 is open at a top end thereof. Secondly, the bottom portion of the cut macromolecular material 32 is cut by the cutter in the same direction in order that the macromolecular material film 40 has a predetermined thickness. Thus, each carbon nanotube 22 is open at a bottom end thereof. The thickness of the macromolecular material film 40 is in the range from 1 to 1000 micrometers. In the present embodiment, the thickness of the macromolecular material film 40 is 20 micrometers.

Figure 6:
FIG. 6 is similar to FIG. 5, but showing only the carbon nanotubes with a uniform length.

FIG. 6 shows the carbon nanotubes 22 of the present invention in isolation, after the macromolecular material 32 has been removed by a solvent. The solvent is selected according to the particular characteristics of the macromolecular material 32. In the preferred embodiment, xylene is adopted to remove the paraffin.

The carbon nanotubes 22 manufactured by the method of the present invention can have a desired length by means of the above-described cutting process. The method is easy to perform, and the length of the carbon nanotubes 22 can be controlled precisely. Furthermore, because the solidified paraffin has high rigidity, this ensures that the solidified macromolecular material 32 when cut has highly even surfaces. Moreover, each carbon nanotube 22 is open at both ends thereof, and all the carbon nanotubes 22 have a uniform length.

It is understood that the above-described embodiments and methods are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A method for manufacturing carbon nanotubes with a uniform length, the method comprising the steps of:
   (a) forming an array of carbon nanotubes on a substrate;
   (b) submerging the carbon nanotubes in a liquid macromolecular material;
   (c) solidifying the liquid macromolecular material;
   (d) cutting the solidified macromolecular material; and
   (e) removing the macromolecular material to thereby obtain the carbon nanotubes with a uniform length;
   wherein step (d) further comprises the step of peeling the solidified macromolecular material with the carbon nanotubes secured therein off the substrate before cutting.

2. The method as claimed in claim 1, wherein step (d) comprises the steps of:
   (d1) cutting the solidified macromolecular material in a direction perpendicular to long axes of the carbon nanotubes, whereby each carbon nanotube is open at one end thereof; and
   (d2) cutting the macromolecular material in the same direction according to a predetermined thickness, whereby each carbon nanotube is open at the other end thereof 3. The method as claimed in claim 1, wherein step (d) is performed by a cutter.

4. The method as claimed in claim 1, wherein a viscosity of the liquid macromolecular material is below 200 centipoises.

5. The method as claimed in claim 1, wherein the liquid macromolecular material is liquid paraffin.

6. The method as claimed in claim 5, wherein in step (e) xylene is used to remove the paraffin.

7. The method as claimed in claim 1, wherein step (a) is performed by way of thermal chemical vapor deposition or plasma enhanced chemical vapor deposition.

8. The method as claimed in claim 1, wherein the uniform length of the carbon nanotubes is in the range from 1 to 1000 micrometers.

9. The methods as claimed in claim 1, wherein in step (b), the carbon nanotubes with the substrate are immersed in a container of liquid macromolecular material.

10. The method as claimed in claim 9, wherein after step (b), the carbon nanotubes with the substrate are taken out of the container.

11. The method as claimed in claim 1, wherein the substrate has a substantially macroscopic planar surface.

12. The method as claimed in claim 1, wherein a surface of the substrate has a plurality of micropores.

13. The method as claimed in claim 12, wherein diameter of the micropores is about 3 nanometers.

14. The method as claimed in claim 13, wherein the length of the carbon nanotubes is longer than the diameter of the micropores.

* * * * *

UNITED STATES PATENT AND TRADEMARK OFFICE
CERTIFICATE OF CORRECTION

| | |
|---|---|
| PATENT NO. | : 7,611,651 B2 |
| APPLICATION NO. | : 11/025160 |
| DATED | : November 3, 2009 |
| INVENTOR(S) | : Huang et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this

Twelfth Day of October, 2010

David J. Kappos
*Director of the United States Patent and Trademark Office*